(12) United States Patent
Stojkovic

(10) Patent No.: US 10,046,710 B2
(45) Date of Patent: Aug. 14, 2018

(54) VERSATILE ARTICLE RETAINER ASSEMBLY FOR A MOTOR VEHICLE

(71) Applicant: FORD GLOBAL TECHNOLOGIES, LLC, Dearborn, MI (US)

(72) Inventor: Dragan B. Stojkovic, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 5 days.

(21) Appl. No.: 15/071,997

(22) Filed: Mar. 16, 2016

(65) Prior Publication Data
US 2017/0267185 A1 Sep. 21, 2017

(51) Int. Cl.
*B60R 7/06* (2006.01)
*B60R 16/03* (2006.01)
*B60R 11/02* (2006.01)
*B60L 1/00* (2006.01)
*B60R 11/00* (2006.01)

(52) U.S. Cl.
CPC ............ *B60R 7/06* (2013.01); *B60R 11/0241* (2013.01); *B60R 16/03* (2013.01); *B60L 1/00* (2013.01); *B60R 2011/0005* (2013.01); *B60R 2011/0075* (2013.01)

(58) Field of Classification Search
CPC ................. B60R 11/0241; B60R 16/03; B60R 2011/0005; B60R 2011/0075; B60R 7/06; B60L 1/00
See application file for complete search history.

(56) References Cited

U.S. PATENT DOCUMENTS

| 5,738,228 A | 4/1998 | Bittinger |
| 6,685,034 B1 | 2/2004 | Cooke |
| 7,648,114 B2 | 1/2010 | Akerstedt et al. |
| 8,104,816 B2 * | 1/2012 | Lupton, III ............... B60R 7/06 296/24.34 |
| 9,162,627 B2 | 10/2015 | Greiner et al. |
| 2008/0073927 A1 | 3/2008 | Schoemann et al. |
| 2010/0314521 A1 | 12/2010 | Pauken et al. |

* cited by examiner

*Primary Examiner* — D Glenn Dayoan
*Assistant Examiner* — Melissa A Black
(74) *Attorney, Agent, or Firm* — Vichit Chea; King & Schickli, PLLC

(57) ABSTRACT

An article retainer assembly is provided. That article retainer assembly includes a housing. First and second retainers are carried on the housing. The first retainer includes a first set of opposed, flexible retaining flaps defining a first slit therebetween. The second retainer includes a second set of opposed, flexible retaining flaps defining a second slit therebetween.

13 Claims, 10 Drawing Sheets

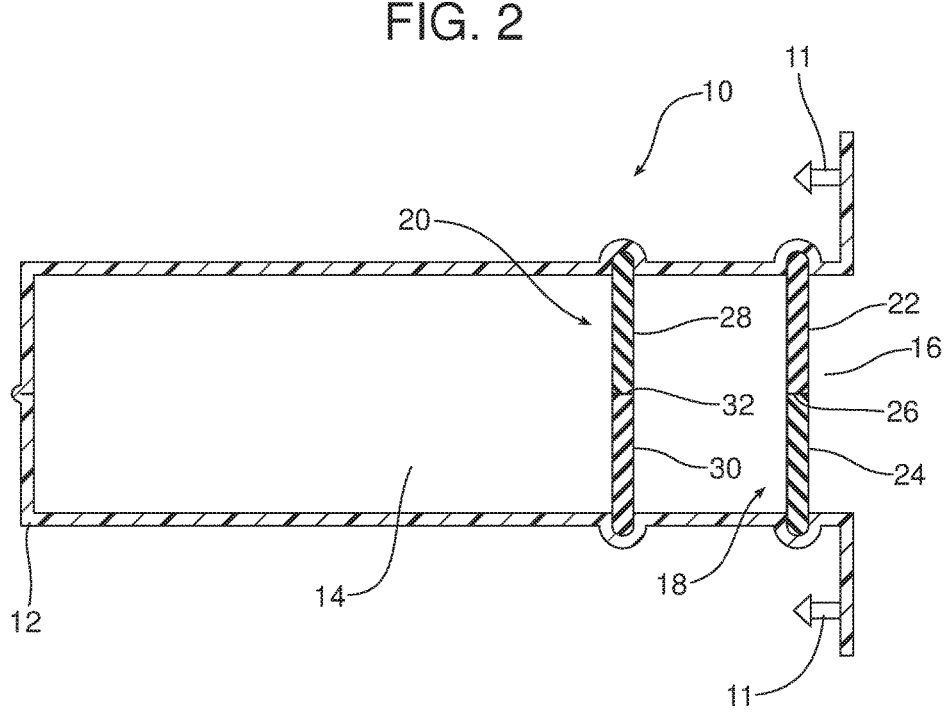

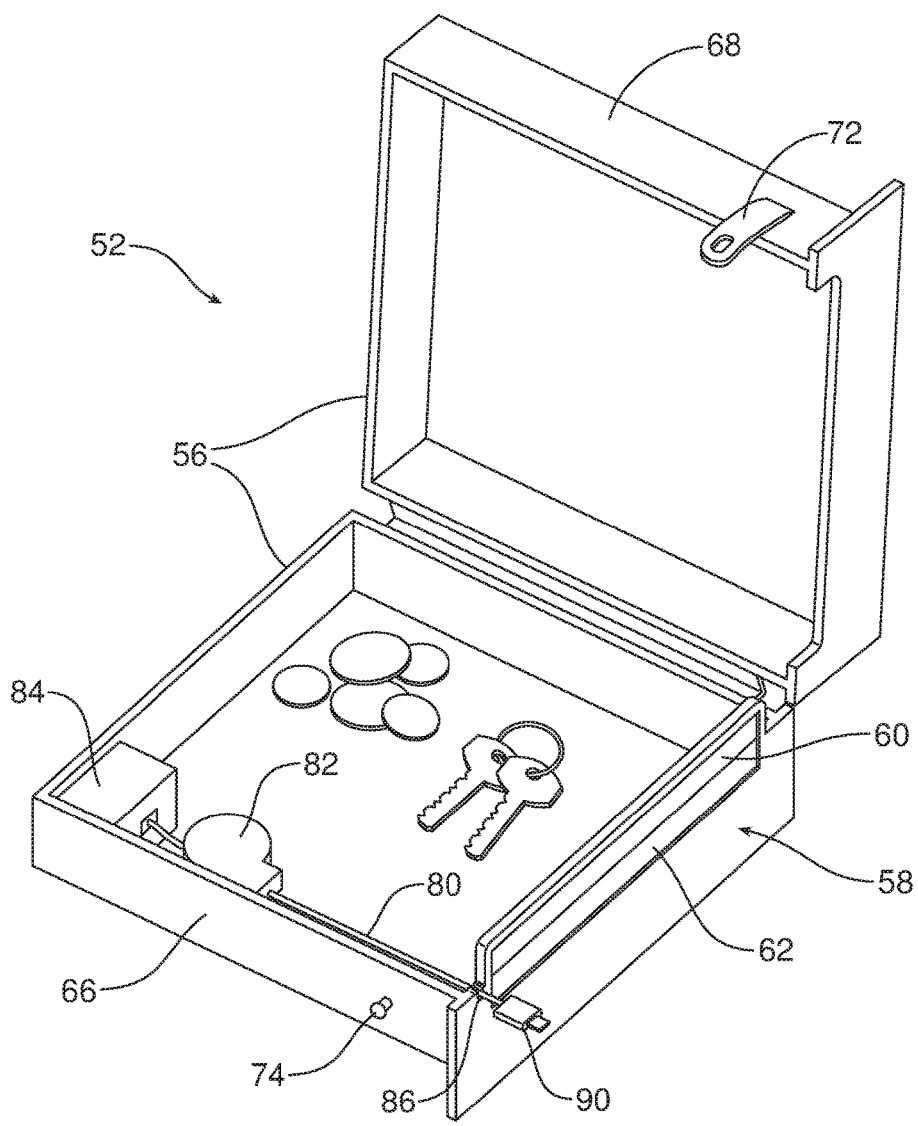

US 10,046,710 B2

VERSATILE ARTICLE RETAINER ASSEMBLY FOR A MOTOR VEHICLE

TECHNICAL FIELD

This document relates generally to the motor vehicle equipment field and, more particularly, to an article retainer assembly for a motor vehicle that is sufficiently versatile to hold a large number of every day items for the vehicle operator at a convenient to reach location.

BACKGROUND

U.S. Pat. No. 9,162,627 discloses a console assembly including two opposed, flexible members adapted to hold an article therebetween at a convenient, centrally located location within a motor vehicle.

This document relates to a new and improved article retainer assembly having the ability to securely hold various every day use items where they can easily be reached in the motor vehicle. Advantageously, the article retainer assembly is particularly versatile and useful for a number of applications such as holding cell phones or other electronic devices, writing utensils, credit cards or other useful items. In some embodiments, the new and improved article retainer assembly also allows one to easily transport items to a location remote from the motor vehicle.

SUMMARY

In accordance with the purposes and benefits described herein, an article retainer assembly is provided for a motor vehicle. In a first embodiment, that article retainer assembly comprises a housing and first and second retainers carried on the housing. The first retainer includes a first set of opposed, flexible retaining flaps defining a first slit therebetween. The second retainer includes a second set of opposed, flexible retaining flaps defining a second slit therebetween.

In one particularly useful embodiment, the first retainer and the second retainer are aligned. Further, the housing defines a storage cavity and the first set of opposed, flexible retaining flaps and the second set of opposed, flexible retaining flaps are oriented so that the first slit and the second slit are aligned in the storage cavity.

In another possible embodiment the housing includes a storage compartment and the first set of opposed, flexible retaining flaps and the second set of opposed, flexible retaining flaps extend across the storage compartment.

That storage compartment includes an opening in the housing for accessing the storage compartment. In such an embodiment the first set of opposed, flexible retaining flaps may extend across the opening.

In accordance with a further aspect, the article retainer assembly may include a receiver in a panel, such as the instrument panel or center console of the motor vehicle. In such an embodiment the housing is removably received within the receiver whereby the housing may be removed from the vehicle and carried to a remote location with the articles contained therein, including those articles held in the first and second retainers.

In accordance with a second embodiment, an article retainer assembly is provided and comprises a housing, and an integral charge cord for charging the electrical device. In this embodiment, the retainer may include a first set of opposed, flexible retaining flaps defining a slit therebetween for holding an article. The article retainer assembly may further include a power source carried on the housing and connected to the integral charge cord. Further, the article retainer assembly may include a charge cord retractor mechanism carried on the housing.

This embodiment of the article retainer assembly may further include a receiver in a panel of the motor vehicle. In such an embodiment, the housing may be removably received within the receiver whereby the housing may be removed from the vehicle and carried to a remote location with any article or device held in the housing including in the retainer.

The housing may also include a first section, a second section and a fastener mechanism securing the first section and the section together. Further, the housing may include a hinge assembly pivotally connecting the first section to the second section.

In yet another embodiment, an article retainer system is provided. That article retainer system comprises a panel in a motor vehicle including a receiver, an article retainer assembly, including a housing and a retainer carried on the housing. That retainer may include at least one set of opposed, flexible retaining flaps defining a slit therebetween for holding an article. Further, it should be appreciated that the article retainer assembly is removably received in the receiver and may be removed from the motor vehicle and used in a remote location.

In this embodiment the housing may include a first section, a second section and a fastener mechanism securing the first section to the second section. Further, the housing may include a hinge assembly for pivotally connecting the first section to the second section. That hinge assembly may be provided on the housing opposite the article retainer. In addition, the article retainer may be provided on the first section of the housing.

In the following description, there are shown and described several preferred embodiments of the article retainer assembly and the article retainer system. As it should be realized, the article retainer assembly and the article retainer system are capable of other, different embodiments and their several details are capable of modification in various, obvious aspects all without departing from the assembly and system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the article retainer assembly and the article retainer system and together with the description serve to explain certain principles thereof. In the drawing figures:

FIG. 2 is a detailed cross-sectional view of the article retainer assembly illustrated in FIG. 1 clearly showing, and first and second retainers for holding an article.

FIG. 5 is a detailed perspective view of an alternative embodiment to that illustrated in FIGS. 4a and 4b. In this embodiment, the entire structure of the article retainer assembly is carried on a first section of the housing.

Reference will now be made in detail to the present preferred embodiments of the article retainer and article retainer system, examples of which are illustrated in the accompanying drawing figures.

DETAILED DESCRIPTION

Figure 1:
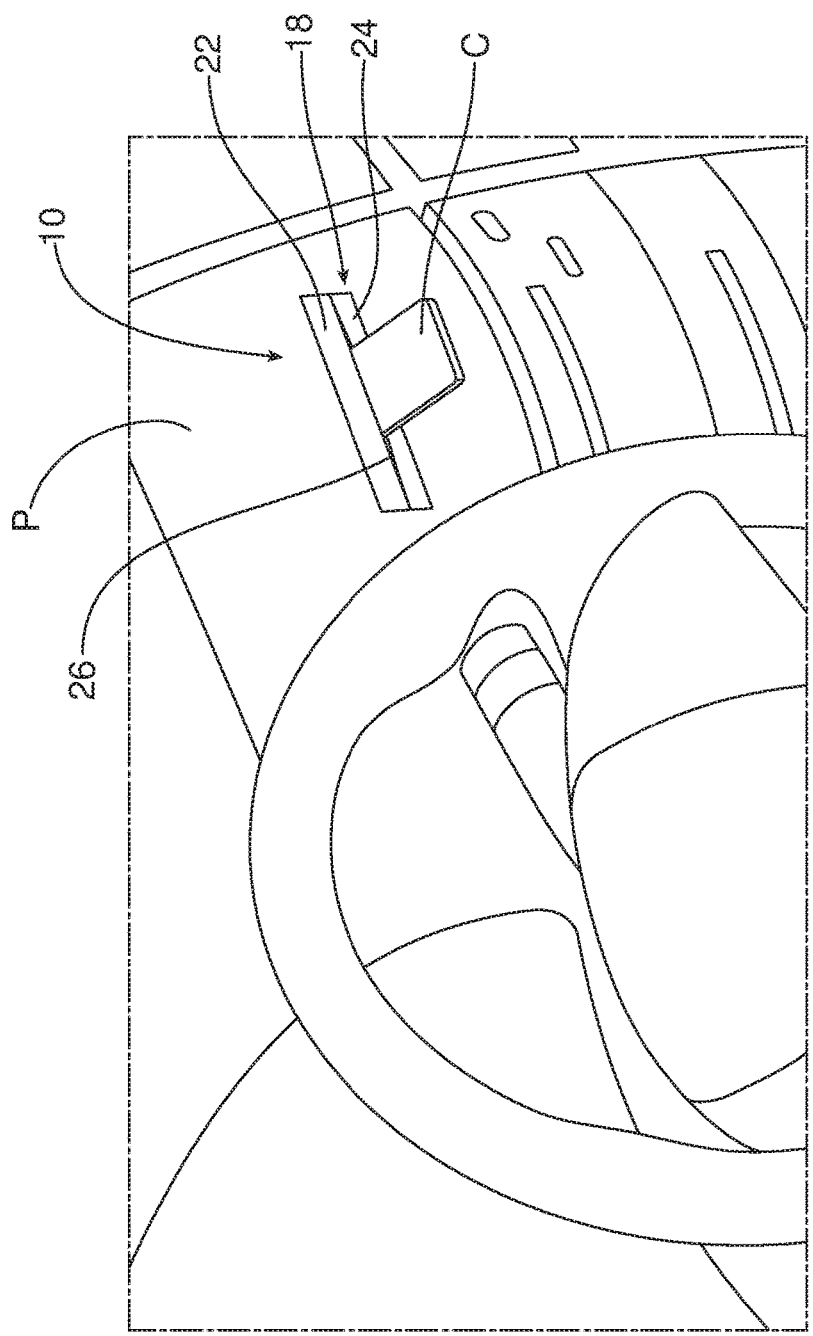
FIG. 1 is a perspective view of an instrument panel of a motor vehicle including an article retainer assembly provided at a convenient location at a central position of the instrument panel.
Figure 2A:
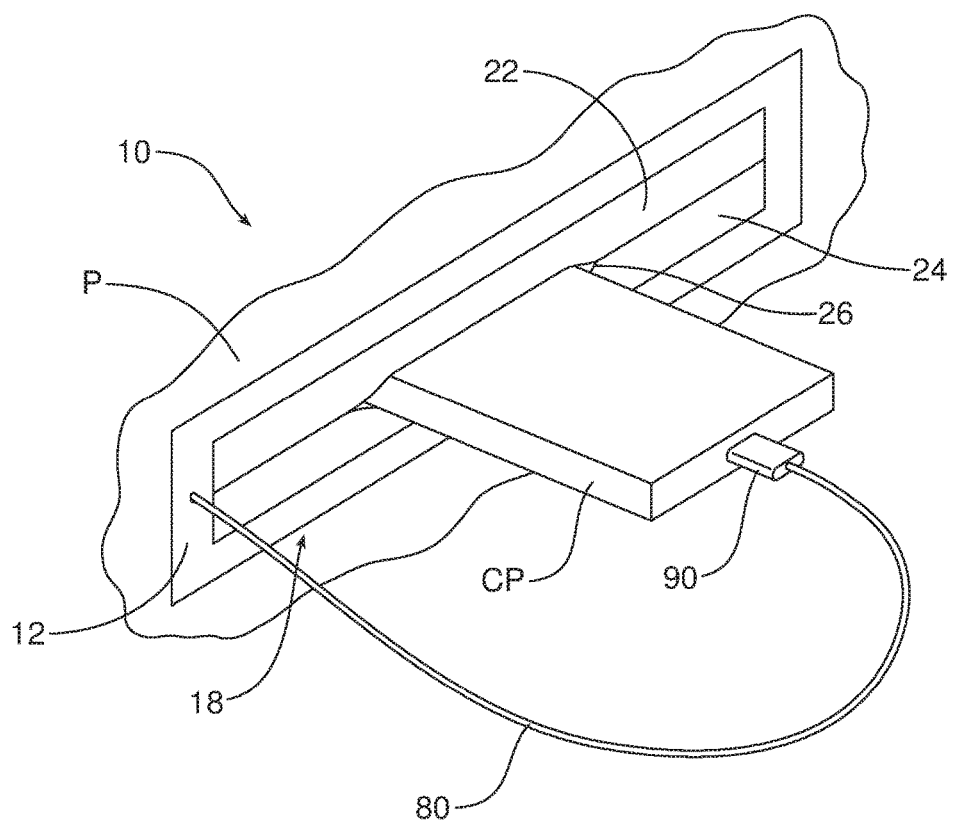
FIGS. 2a-2d are detailed perspective views illustrating various articles being held in the article retainer assembly.
Figure 2B:
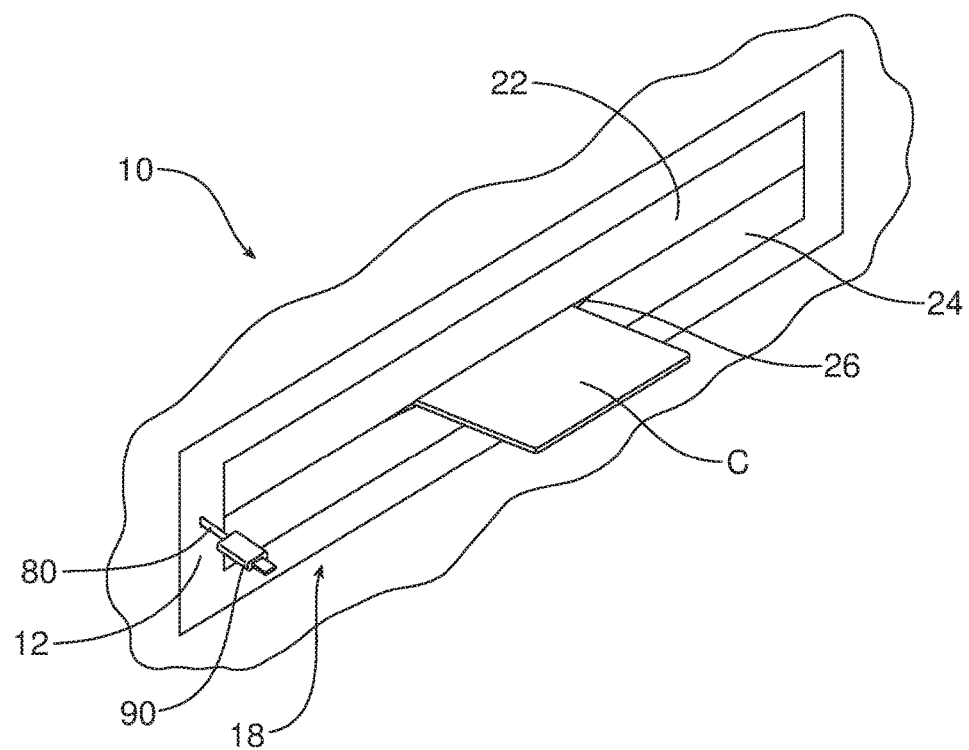
Figure 2C:
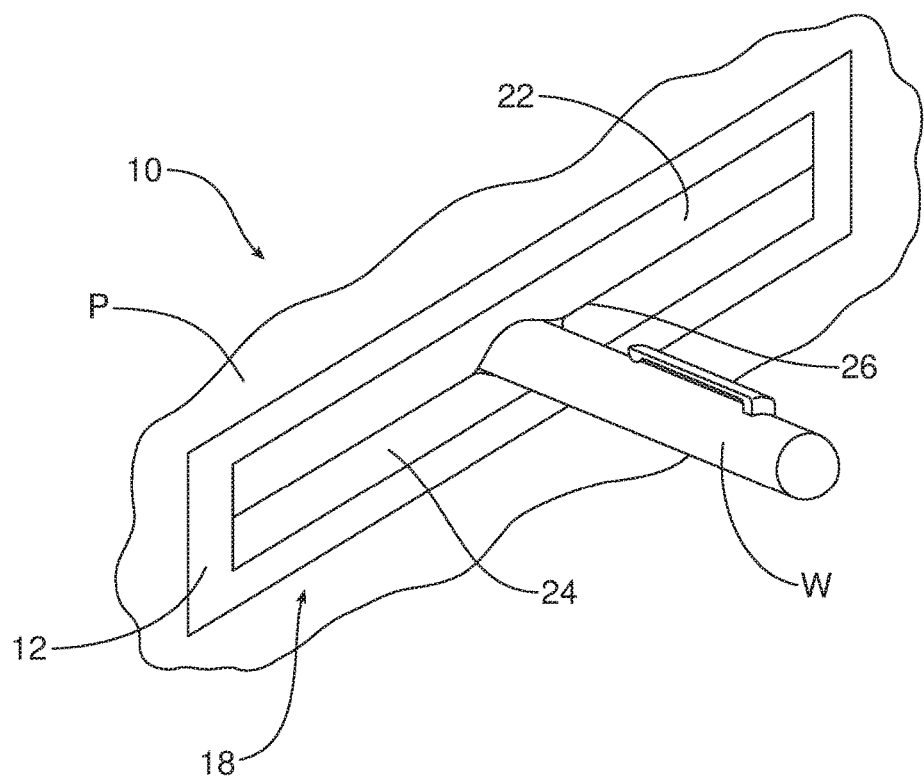
Figure 2D:
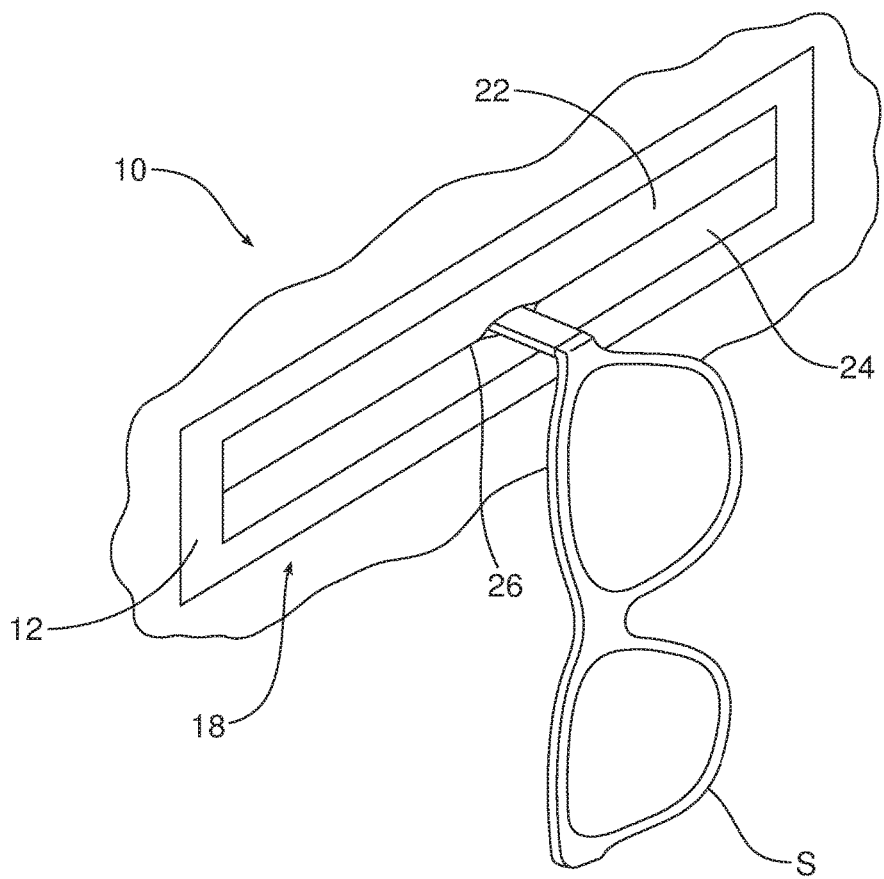

Reference is now made to FIGS. 1 and 2 illustrating a first embodiment of an article retainer assembly 10. As illustrated, the article retainer assembly 10 may be mounted in the instrument panel or center console P of a motor vehicle at a convenient location within reach of the driver of that vehicle by means of anchors 11.

As best illustrated in FIG. 2, the article retainer assembly 10 includes a housing 12 which has an elongated storage cavity or compartment 14 accessible through an opening 16 in the end of the housing. As further illustrated, the article retainer assembly 10 includes a first retainer 18 and a second retainer 20 carried on the housing 12 extending across the storage cavity/compartment 14. Thus, the first retainer 18 and the second retainer 20 are aligned in the housing 12.

As best illustrated in FIG. 2, the first retainer 18 includes a first set of opposed, flexible retaining flaps 22, 24 defining a first slit 26 therebetween. Similarly, a second retainer 20 comprises a second set of opposed, flexible retaining flaps 28, 30 defining a second slit 32 therebetween. Preferably the flaps 22, 24, 28, 30 are all made from a flexible and resilient material such as rubber, neoprene or the like. The opposed sets of flaps 22, 24, 28, 30 are sufficiently stiff and resilient to receive and hold various articles or implements such as, for example, the cell phone CP illustrated in FIG. 2a, the credit card C illustrated in FIGS. 1 and 2b, the writing pen W illustrated in FIG. 2c, and the frame of the sunglasses S illustrated in FIG. 2d by means of frictional engagement of the portions of those items that are pressed into and through the aligned slits 26, 32 of the two retainers 18, 20.

As should be appreciated, the cooperating, opposed flaps 22, 24 of the first retainer 18 squeeze the item being held at a first point of engagement while the cooperating opposed flaps 28, 30 of the second retainer 20 squeeze and hold the item at a second point of engagement. Advantageously, the two points of engagement better secure and hold an item in the desired position in the article retainer assembly 10 where it can be conveniently reached when needed by the motor vehicle operator. In contrast, a single point of engagement allows the item to more easily pivot about that point and work free from the retainer and become loose in the motor vehicle.

Figure 3:
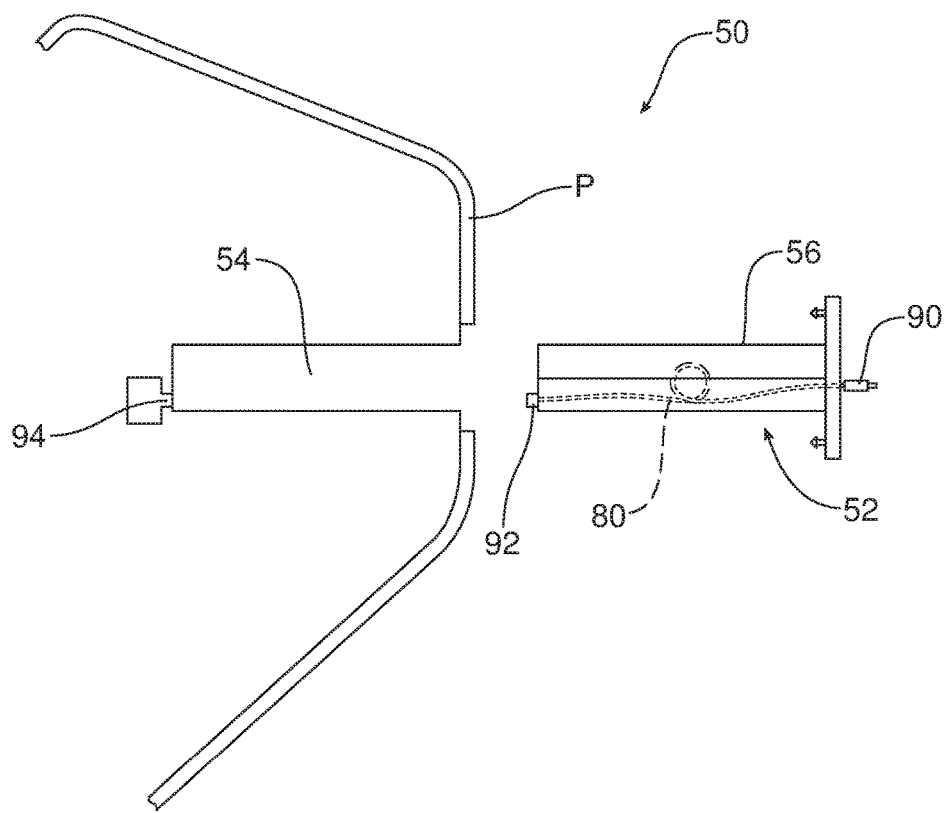
FIG. 3 is a schematic side elevational view of the article retainer system illustrating the article retainer assembly removed from the receiver provided in the dashboard panel.

Reference is now made to FIG. 3 illustrating an article retainer system 50 which comprises an article retainer assembly 52 that is removably received and held in a receiver 54 provided in a panel such as instrument panel P of the motor vehicle. FIG. 3 illustrates the article retainer assembly 52 removed from the receiver 54 for use in a remote location outside of the motor vehicle.

Figure 4A:
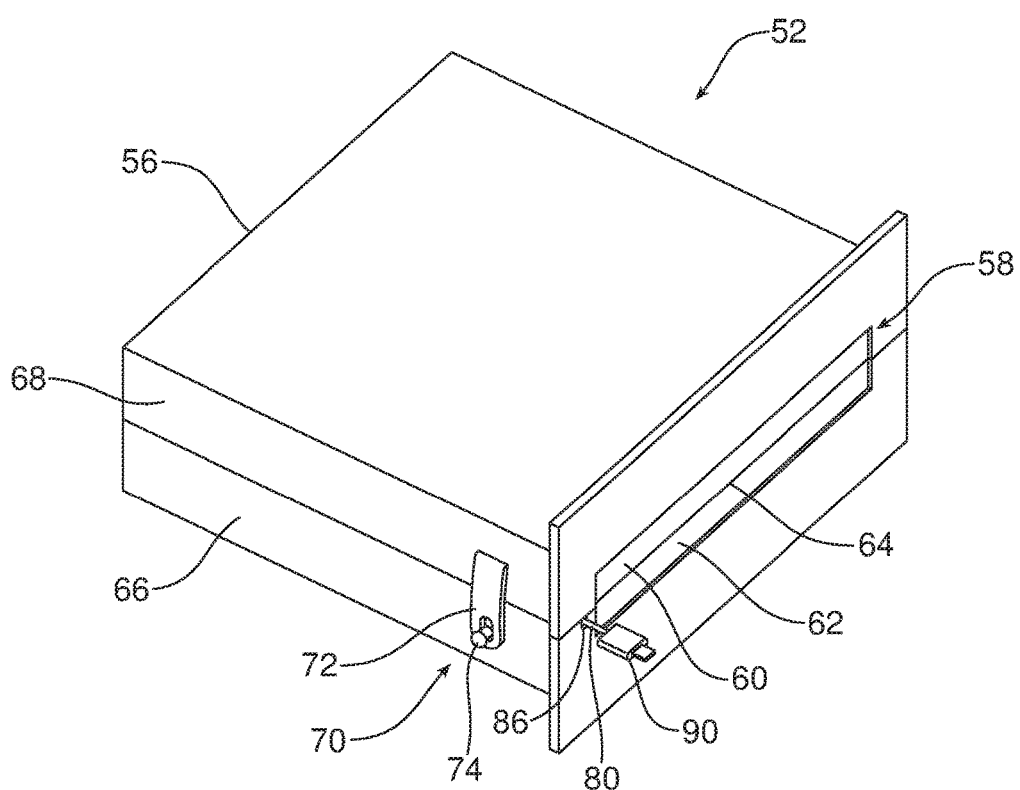
FIGS. 4a and 4b are detailed perspective views illustrating how the two sections of the housing of the article retainer assembly may be opened to access the contents held in the housing including an integral charge cord, a charge cord retractor mechanism and a power source.
Figure 4B:
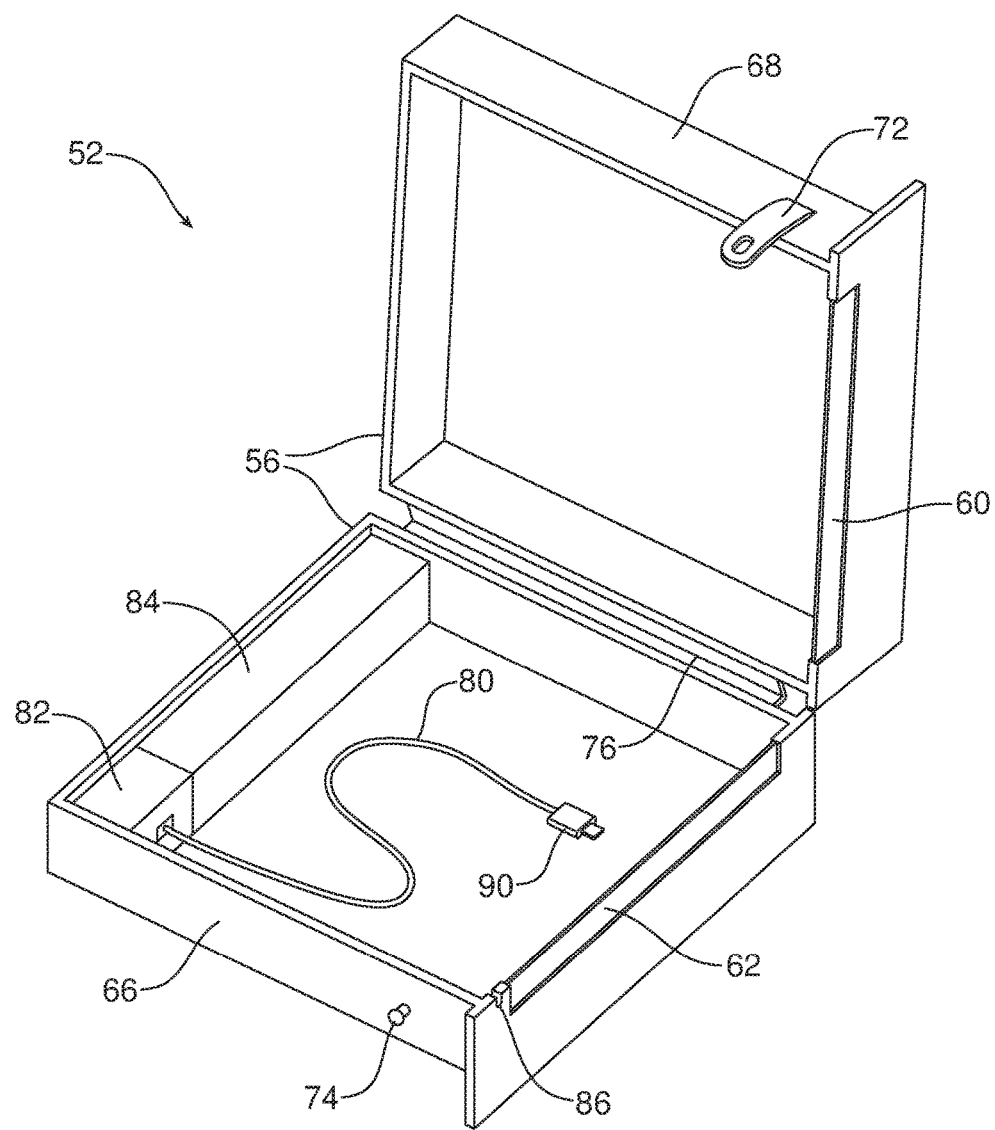

As illustrated in FIGS. 3, 4a and 4b, the article retainer assembly 52 includes a housing 56 and a retainer 58 carried on the housing. The retainer 58 comprises at least one set of opposed, flexible retaining flaps 60, 62 defining a slit 64 therebetween for holding an article or item.

As best illustrated in FIGS. 4a and 4b, the housing 56 includes a first section 66 and a second section 68. A fastener mechanism 70 secures the first and second sections 66, 68 together. In the illustrated embodiment the fastener 70 comprises a flexible latching strap 72 on the second section 68 that engages a lug 74 on the front section 66. FIG. 4a illustrates the housing 56 in the closed position. In contrast, FIG. 4b illustrates the housing 56 in the opened position. In the illustrated embodiment a hinge assembly 76 secures the housing together opposite the fastener mechanism 70 thereby allowing the two sections 66, 68 to pivot open to gain access to the contents of the housing 56. In one possible embodiment of the housing 56 illustrated in FIG. 5, the entire article retainer assembly 52 including both flaps 60, 62 are provided in the first section 66 of the housing 56.

As further illustrated in FIGS. 4 and 5, the article retainer 52 may include an integral charge cord 80, a charge cord retractor mechanism 82 and a power source 84, such as a battery. As illustrated in the FIG. 5 embodiment, the charge cord 82 may extend through a slot 86 in a sidewall of the housing 56. As further illustrated, the slot 86 may be provided next to the retainer 58 including the opposed, flexible retaining flaps 60, 62 and intermediate slot 64 that receives and holds an item in the manner described above.

When one wishes to charge an electrical device such as a cell phone or MP3 player, one engages the charge plug 90, pays out the charge cord 80 through the slot 86 and plugs the charge plug into the electronic device. If desired, the electronic device may be inserted into the retainer 58 between the flaps 60, 62 in order to hold it in a convenient position for charging. After charging, one unplugs the charge plug 90 from the electronic device and allows the charge cord retractor mechanism 82 to retract the charger cord 80 until the charge plug 90 engages the face of the housing 56 adjacent the slot 86.

In the event the article retainer 50 is of the type that is received in a receiver 54 of a motor vehicle instrument panel P in the manner of the retainer illustrated in FIG. 3, the battery power source 84 could include a plug 92 that would make electrical contact with a charger port 94 carried within the instrument panel P of a motor vehicle. In this way the power source 84 could be maintained in a charged state as necessary so that the power source is always ready to act as a supplemental power supply for an electrical device when the article retainer 52 is removed from and used at a remote location with respect to the motor vehicle.

The foregoing has been presented for purposes of illustration and description. It is not intended to be exhaustive or to limit the embodiments to the precise form disclosed. Obvious modifications and variations are possible in light of the above teachings. For example, while the embodiments of the article retainer assembly 52 illustrated in FIGS. 3, 4a, 4b and 5 all include a single retainer 52, it should be appreciated that they could include two retainers 18, 20 as illustrated in the embodiment of the article retainer found in FIGS. 1, 2 and 2a-2d. All such modifications and variations are within the scope of the appended claims when interpreted in accordance with the breadth to which they are fairly, legally and equitably entitled.

What is claimed:

1. An article retainer assembly, comprising:
a housing defining a storage compartment;
a first retainer carried on said housing, said first retainer including a first set of opposed, flexible retaining flaps defining a first slit therebetween; and
a second retainer carried on said housing, said second retainer including a second set of opposed, flexible retaining flaps defining a second slit therebetween wherein said first set of opposed, flexible retaining flaps and said second set of opposed, flexible retaining flaps extend across said storage compartment.

2. The article retainer assembly of claim 1, wherein said storage compartment includes an opening in said housing for accessing said storage compartment.

3. The article retainer assembly of claim 2, wherein said first set of opposed, flexible retaining flaps extend across said opening.

4. The article retainer assembly of claim 2, further including a receiver in a panel of a motor vehicle.

5. The article retainer assembly of claim 4, wherein said housing is removably received within said receiver whereby said housing may be removed from said vehicle and carried to a remote location.

6. An article retainer assembly, comprising:
a receiver in a panel of a motor vehicle;
a housing, wherein said housing is removably received within said receiver whereby said housing may be removed from said vehicle and carried to a remote location;
a retainer carried on said housing, said retainer including a set of opposed, flexible retaining flaps defining a slit therebetween for holding an article;
a charge cord retractor mechanism carried on said housing;
an integral charge cord for charging an electrical device; and
a power source carried on said housing and connected to said integral charge cord.

7. The article retainer assembly of claim 6, wherein said housing includes a first section, a second section and a fastener mechanism securing said first section and said second section together.

8. The article retainer assembly of claim 7, further including a hinge assembly pivotally connecting said first section to said second section.

9. An article retainer system, comprising:
a panel in a motor vehicle including a receiver;
an article retainer assembly including a housing and a retainer carried on said housing, said retainer including at least one set of opposed, flexible retaining flaps defining a slit therebetween for holding an article wherein said article retainer is removably received in said receiver and may be removed from said motor vehicle and used at a remote location.

10. The article retainer system of claim 9, wherein said housing includes a first section, a second section and a fastener mechanism securing said first section to said second section.

11. The article retainer system of claim 10, further including a hinge assembly pivotally connecting said first section to said second section.

12. The article retainer system of claim 11, wherein said hinge assembly is provided on said housing opposite said fastener mechanism.

13. The article retainer system of claim 12, wherein said article retainer is provided on said first section.

* * * * *